United States Patent
Hong

(10) Patent No.: US 11,218,934 B2
(45) Date of Patent: Jan. 4, 2022

(54) BASE STATION SWITCHING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 3 days.

(21) Appl. No.: 16/636,015

(22) PCT Filed: Aug. 3, 2017

(86) PCT No.: PCT/CN2017/095792
§ 371 (c)(1),
(2) Date: Feb. 2, 2020

(87) PCT Pub. No.: WO2019/024038
PCT Pub. Date: Feb. 7, 2019

(65) Prior Publication Data
US 2021/0144607 A1    May 13, 2021

(51) Int. Cl.
*H04W 4/00* (2018.01)
*H04W 36/08* (2009.01)
(Continued)

(52) U.S. Cl.
CPC ........ *H04W 36/08* (2013.01); *H04B 7/18506* (2013.01); *H04W 36/30* (2013.01); *H04W 76/15* (2018.02)

(58) Field of Classification Search
CPC ..... H04W 36/08; H04W 76/15; H04W 36/30; H04B 7/18506
(Continued)

(56) References Cited

U.S. PATENT DOCUMENTS 9,467,922 B1* 10/2016 Buchmueller ..... H04B 7/18506
9,881,021 B2* 1/2018 Pasko .................. G08G 5/0043
(Continued)

FOREIGN PATENT DOCUMENTS

CN     106355860 A     1/2007
CN     101815330 A     8/2010
(Continued)

OTHER PUBLICATIONS

ISA State Intellectual Property Office of the People's Republic of China, International Search Report dated Mar. 23, 2018 in Application No. PCT/CN2017/095792.
(Continued)

*Primary Examiner* — Amancio Gonzalez
(74) *Attorney, Agent, or Firm* — Syncoda LLC; Feng Ma

(57) ABSTRACT

A base station switching method for a source base station includes: receiving a measurement report sent by the unmanned aerial vehicle, wherein the measurement report comprises information used for indicating a target base station to which the unmanned aerial vehicle requests to switch; when determined to switch to the target base station according to the measurement report, sending a switch request carrying first information to the target base station, wherein the first information is used to indicate that a terminal requesting the switch is an unmanned aerial vehicle; when receiving a handover request acknowledge returned by the target base station, performing a switching operation from the source base station to the target base station. As such, the source base station achieves a base station switch for an unmanned aerial vehicle, ensures continuity of service for the unmanned aerial vehicle, and broadens the application range of the unmanned aerial vehicle.

18 Claims, 7 Drawing Sheets

(51) Int. Cl.
*H04W 76/15* (2018.01)
*H04B 7/185* (2006.01)
*H04W 36/30* (2009.01)

(58) Field of Classification Search
USPC .......................................................... 370/331
See application file for complete search history.

(56) References Cited

U.S. PATENT DOCUMENTS

| | | | |
|---|---|---|---|
| 10,827,019 B2* | 11/2020 | Rubin | H04W 12/069 |
| 10,952,113 B2* | 3/2021 | Mahkonen | B64C 39/024 |
| 2015/0236778 A1 | 8/2015 | Jalali | |
| 2017/0187450 A1* | 6/2017 | Jalali | H04B 7/1555 |
| 2019/0306768 A1* | 10/2019 | Kim | H04B 17/382 |
| 2019/0387428 A1* | 12/2019 | Ahmad | H04L 69/08 |
| 2020/0120563 A1* | 4/2020 | Tak Cs | G08G 5/003 |

FOREIGN PATENT DOCUMENTS

| | | |
|---|---|---|
| CN | 205787905 U | 12/2016 |
| WO | 2016130495 A1 | 8/2016 |

OTHER PUBLICATIONS

Third Office Action of Chinese Patent Application No. 201780000823.6, dated May 10, 2021.

* cited by examiner

BASE STATION SWITCHING METHOD AND APPARATUS

CROSS-REFERENCE TO RELATED APPLICATION

This application is a national stage of International Application No. PCT/CN2017/095792 filed on Aug. 3, 2017, the disclosure of which is hereby incorporated by reference in its entirety.

TECHNICAL FIELD

The present disclosure relates to the field of communications, and in particular, to a base station handover method and apparatus.

BACKGROUND

An unmanned aerial vehicle is referred to as an UAV, which is an unmanned vehicle manipulated by a radio remote control device and its own program control apparatus.

With continuous development of unmanned aerial vehicle technology, unmanned aerial vehicles have also been widely used. In related technologies, in order to further expand an application range of the unmanned aerial vehicles, cellular networks need to provide service that meet requirements of the unmanned aerial vehicles. However, existing cellular networks cannot provide service that meet requirements of the unmanned aerial vehicles yet, which reduces a usage rate of the unmanned aerial vehicles.

SUMMARY

The embodiments of the present disclosure provide a base station handover method and apparatus to solve deficiencies existing in the related art.

According to a first aspect of an embodiment of the present disclosure, there is provided a base station handover method, wherein the method is applied to a source base station, the source base station is a base station currently providing service for an unmanned aerial vehicle, and the method includes:

receiving a measurement report sent by the unmanned aerial vehicle, wherein the measurement report includes information used to indicate a target base station for which the unmanned aerial vehicle requests handover;

sending a handover request carrying first information to the target base station, when it is determined that handover with the target base station is to be performed according to the measurement report, wherein the first information is used to indicate that a terminal requesting handover is an unmanned aerial vehicle;

performing a handover operation switching from the source base station to the target base station, when a handover request acknowledgement returned by the target base station is received.

Optionally, the handover request further carries second information, the second information is used to indicate that the target base station needs to establish a first dedicated bearer for control commands and establish a second dedicated bearer for data transmission for the unmanned aerial vehicle.

Optionally, the handover request further carries third information, the third information includes a first QCI for indicating the first dedicated bearer and a second QCI for indicating the second dedicated bearer, and the first QCI is different from the second QCI.

According to a second aspect of an embodiment of the present disclosure, there is provided a base station handover method, wherein the method is applied to a target base station, the target base station is a base station that an unmanned aerial vehicle requests for handover, and a source base station is a base station currently providing service for the unmanned aerial vehicle, and the method includes:

receiving a handover request carrying first information sent by the source base station, wherein the first information is used to indicate that a terminal requesting handover is an unmanned aerial vehicle;

judging whether the target base station itself is able to provide service for the unmanned aerial vehicle according to the handover request;

sending a handover request acknowledge to the source base station when it is determined that the target base station is able to provide service for the unmanned aerial vehicle, such that the source base station performs a handover operation switching from the source base station to the target base station according to the handover request acknowledge.

Optionally, the handover request further carries second information, the second information is used to indicate that the target base station needs to establish a first dedicated bearer for control commands and establish a second dedicated bearer for data transmission for the unmanned aerial vehicle;

judging whether the target base station itself is able to provide service for the unmanned aerial vehicle according to the handover request includes:

judging, according to the handover request, whether the target base station itself is able to establish a first dedicated bearer for control commands and establishing a second dedicated bearer for data transmission for the unmanned aerial vehicle;

determining that the target base station is able to provide service for the unmanned aerial vehicle, when it is determined that the target base station is able to establish the first dedicated bearer and the second dedicated bearer for the unmanned aerial vehicle;

determining that the target base station is not able to provide service for the unmanned aerial vehicle, when it is determined that the target base station is not able to establish the first dedicated bearer and the second dedicated bearer for the unmanned aerial vehicle.

Optionally, the handover request acknowledge includes information for indicating that the target base station agrees to establish the first dedicated bearer and the second dedicated bearer.

Optionally, the method further includes:

sending a handover request failure to the source base station when it is determined that the target base station is not able to provide service for the unmanned aerial vehicle, wherein the handover request failure includes a reason indicating why the target base station is not able to provide service for the unmanned aerial vehicle.

According to a third aspect of an embodiment of the present disclosure, there is provided a base station handover method, wherein the method is applied to an unmanned aerial vehicle, a base station currently providing service for the unmanned aerial vehicle is a source base station, and the method includes:

detecting that a trigger condition for handover of a base station is met during cell measurement;

sending a measurement report to the source base station, wherein the measurement report includes information used to indicate a target base station for which the unmanned aerial vehicle requests handover.

Optionally, the detecting that a trigger condition for handover of a base station is met includes:

detecting that a signal strength of another base station is greater than a signal strength of the source base station, and a difference between the two signal strengths is greater than a set threshold;

determining that the trigger condition for handover of the base station is met, and determining the another base station as a target base station for which the unmanned aerial vehicle requests handover.

According to a fourth aspect of an embodiment of the present disclosure, there is provided a base station handover apparatus, wherein the apparatus is applied to a source base station, the source base station is a base station currently providing service for an unmanned aerial vehicle, and the apparatus includes:

a receiving module, configured to receive a measurement report sent by the unmanned aerial vehicle, wherein the measurement report includes information used to indicate a target base station for which the unmanned aerial vehicle requests handover;

a sending module, configured to send a handover request carrying first information to the target base station, when it is determined that handover with the target base station is to be performed according to the measurement report, wherein the first information is used to indicate that a terminal requesting handover is an unmanned aerial vehicle;

a handover module, configured to perform a handover operation switching from the source base station to the target base station, when a handover request acknowledgement returned by the target base station is received.

Optionally, the handover request further carries second information, the second information is used to indicate that the target base station needs to establish a first dedicated bearer for control commands and establish a second dedicated bearer for data transmission for the unmanned aerial vehicle.

Optionally, the handover request further carries third information, the third information includes a first QCI for indicating the first dedicated bearer and a second QCI for indicating the second dedicated bearer, and the first QCI is different from the second QCI.

According to a fifth aspect of an embodiment of the present disclosure, there is provided a base station handover apparatus, wherein the apparatus is applied to a target base station, the target base station is a base station that an unmanned aerial vehicle requests for handover, and a source base station is a base station currently providing service for the unmanned aerial vehicle, and the apparatus includes:

a receiving module, configured to receive a handover request sent by the source base station and carrying first information, wherein the first information is used to indicate that a terminal requesting handover is an unmanned aerial vehicle;

a judging module, configured to judge whether the target base station itself is able to provide service for the unmanned aerial vehicle according to the handover request;

a first sending module, configured to send a handover request acknowledge to the source base station when it is determined that the target base station is able to provide service for the unmanned aerial vehicle, such that the source base station performs a handover operation switching from the source base station to the target base station according to the handover request acknowledge.

Optionally, the handover request further carries second information, the second information is used to indicate that the target base station needs to establish a first dedicated bearer for control commands and establish a second dedicated bearer for data transmission for the unmanned aerial vehicle; the judging module includes:

a judging sub-module, configured to judge, according to the handover request, whether the target base station itself is able to establish a first dedicated bearer for control commands and establishing a second dedicated bearer for data transmission for the unmanned aerial vehicle;

a first determining sub-module, configured to determine that the target base station is able to provide service for the unmanned aerial vehicle, when it is determined that the target base station is able to establish the first dedicated bearer and the second dedicated bearer for the unmanned aerial vehicle;

a second determining sub-module, configured to determine that the target base station is not able to provide service for the unmanned aerial vehicle, when it is determined that the target base station is not able to establish the first dedicated bearer and the second dedicated bearer for the unmanned aerial vehicle.

Optionally, the handover request acknowledge includes information for indicating that the target base station agrees to establish the first dedicated bearer and the second dedicated bearer.

Optionally, the apparatus further includes:

a second sending module, configured to send a handover request failure to the source base station when it is determined that the target base station is not able to provide service for the unmanned aerial vehicle, wherein the handover request failure includes a reason indicating why the target base station is not able to provide service for the unmanned aerial vehicle.

According to a sixth aspect of an embodiment of the present disclosure, there is provided a base station handover apparatus, wherein the apparatus is applied to an unmanned aerial vehicle, a base station currently providing service for the unmanned aerial vehicle is a source base station, and the apparatus includes:

a detecting module, configured to detect that a trigger condition for handover of a base station is met during cell measurement;

a sending module, configured to send a measurement report to the source base station, wherein the measurement report includes information used to indicate a target base station for which the unmanned aerial vehicle requests handover.

Optionally, the detecting module includes:

a detecting sub-module, configured to detect that a signal strength of another base station is greater than a signal strength of the source base station, and a difference between the two signal strengths is greater than a set threshold;

a determining sub-module, configured to determine that the trigger condition for handover of the base station is met, and determining the another base station as a target base station for which the unmanned aerial vehicle requests handover.

According to a seventh aspect of an embodiment of the present disclosure, there is provided a base station handover apparatus, wherein the apparatus is applied to a source base station, the source base station is a base station currently providing service for an unmanned aerial vehicle, and the apparatus includes:

a processor; and a memory for storing processor executable instructions, wherein the processor is configured to perform:

receiving a measurement report sent by the unmanned aerial vehicle, wherein the measurement report includes information used to indicate a target base station for which the unmanned aerial vehicle requests handover;

sending a handover request carrying first information to the target base station, when it is determined that handover with the target base station is to be performed according to the measurement report, wherein the first information is used to indicate that a terminal requesting handover is an unmanned aerial vehicle;

performing a handover operation switching from the source base station to the target base station, when a handover request acknowledgement returned by the target base station is received.

According to an eighth aspect of an embodiment of the present disclosure, there is provided a base station handover apparatus, wherein the apparatus is applied to a target base station, the target base station is a base station that an unmanned aerial vehicle requests for handover, and a source base station is a base station currently providing service for the unmanned aerial vehicle, and the apparatus includes:

a processor; and
a memory for storing processor executable instructions, wherein the processor is configured to perform:

receiving a handover request carrying first information sent by the source base station, wherein the first information is used to indicate that a terminal requesting handover is an unmanned aerial vehicle;

judging whether the target base station itself is able to provide service for the unmanned aerial vehicle according to the handover request;

sending a handover request acknowledge to the source base station when it is determined that the target base station is able to provide service for the unmanned aerial vehicle, such that the source base station performs a handover operation switching from the source base station to the target base station according to the handover request acknowledge.

According to a ninth aspect of an embodiment of the present disclosure, there is provided a base station handover apparatus, wherein the apparatus is applied to an unmanned aerial vehicle, a base station currently providing service for the unmanned aerial vehicle is a source base station, and the apparatus includes:

a processor; and
a memory for storing processor executable instructions, wherein the processor is configured to perform:

detecting that a trigger condition for handover of a base station is met during cell measurement;

sending a measurement report to the source base station, wherein the measurement report includes information used to indicate a target base station for which the unmanned aerial vehicle requests handover.

According to a tenth aspect of an embodiment of the present disclosure, there is provided a non-transitory computer readable storage medium, having stored a computer program thereon, wherein the computer program is configured to perform the base station handover method according to the first aspect.

According to an eleventh aspect of an embodiment of the present disclosure, there is provided a non-transitory computer readable storage medium, having stored a computer program thereon, wherein the computer program is configured to perform the base station handover method according to the second aspect.

According to a twelfth aspect of an embodiment of the present disclosure, there is provided a non-transitory computer readable storage medium, having stored a computer program thereon, wherein the computer program is configured to perform the base station handover method according to the third aspect.

The technical solutions provided by the embodiments of the present disclosure can include the following beneficial effects.

In the embodiment of the present disclosure, the source base station may receive a measurement report sent by an unmanned aerial vehicle. When it is determined that the handover with a target base station is to be performed according to the measurement report, the source base station may also send a handover request carrying first information to the target base station. The first information is used to indicate that a terminal requesting handover is an unmanned aerial vehicle. Then, when a handover request acknowledge returned by the target base station is received, a handover operation switching from the source base station to the target base station can be performed, thereby realizing the handover of the base station for the unmanned aerial vehicle, ensuring continuity of service of the unmanned aerial vehicle and also broadening an application range of the unmanned aerial vehicles.

In the embodiment of the present disclosure, after receiving the handover request carrying the first information sent by the source base station, the target base station learns that the terminal requesting the handover is an unmanned aerial vehicle, and determines whether it can provide service for the unmanned aerial vehicle firstly. Only when it is determined that the target base station can provide service for the unmanned aerial vehicle, a handover request acknowledge is sent to the source base station, thereby ensuring continuity of service of the unmanned aerial vehicle and also improving efficiency and reliability of the handover of the base station.

In the embodiment of the present disclosure, after receiving the handover request carrying the first information sent by the source base station, the target base station learns that the terminal requesting the handover is an unmanned aerial vehicle, and determines whether it can provide service for the unmanned aerial vehicle firstly. When it is determined that the target base station can provide service for the unmanned aerial vehicle, a handover request acknowledge is sent to the source base station. When it is determined that the target base station cannot provide service for the unmanned aerial vehicle, a handover request failure is sent to the source base station. The handover request failure includes a reason indicating why the target base station cannot provide service for the unmanned aerial vehicle, so that the source base station can learn about a current situation of the target base station in time, which facilitates the source base station to adopt different processing manners according to different situations, thereby improving efficiency of the handover of the base station.

In the embodiment of the present disclosure, when the unmanned aerial vehicle detects that a trigger condition for handover of a base station is met during cell measurement, it automatically sends a measurement report to the source base station. The measurement report includes information used to indicate a target base station for which the unmanned aerial vehicle requests handover, such that the source base station may learn about the demand of the unmanned aerial vehicle in time and improve efficiency of the handover of the base station.

It should be understood that both the foregoing general description and the following detailed description are exemplary and explanatory only and are not restrictive of the disclosure.

BRIEF DESCRIPTION OF THE DRAWINGS

The drawings herein are incorporated in and constitute a part of this specification, illustrate embodiments consistent with the present disclosure, and together with the description serve to explain the principles of the present disclosure.

DETAILED DESCRIPTION

Reference will now be made in detail to exemplary embodiments, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. Rather, they are merely examples of apparatuses and methods consistent with some aspects of the disclosure as detailed in the appended claims.

The terminology used in this disclosure is for the purpose of describing particular embodiments only and is not intended to limit the disclosure. As used in this disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in this disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "at that time" or "when" or "in response to determining".

Figure 1:
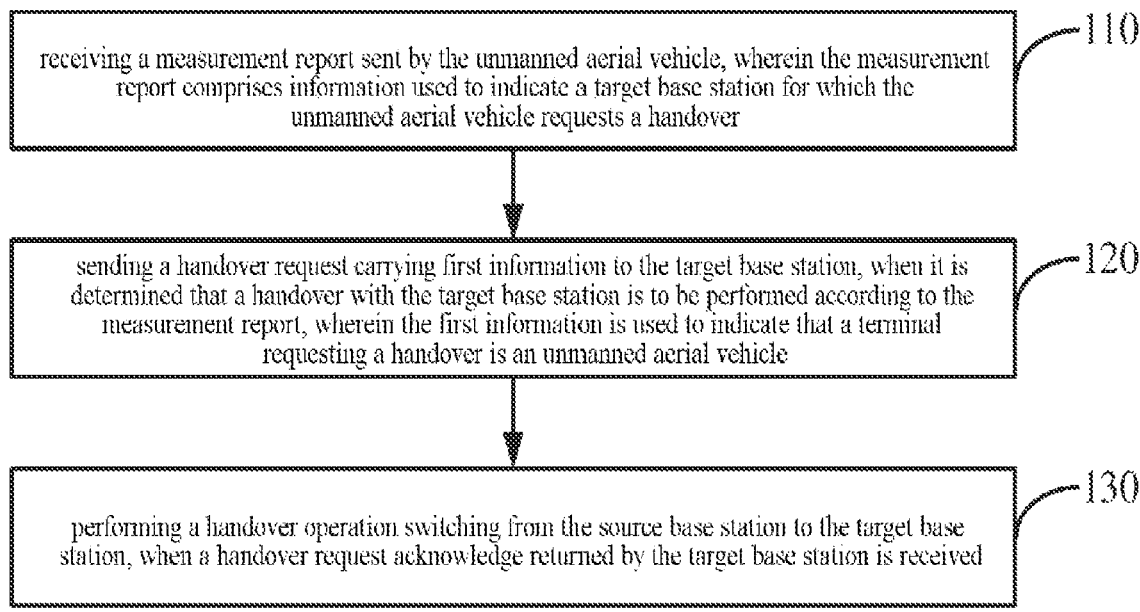
FIG. 1 is a flowchart of a base station handover method according to an exemplary embodiment.
Figure 2:
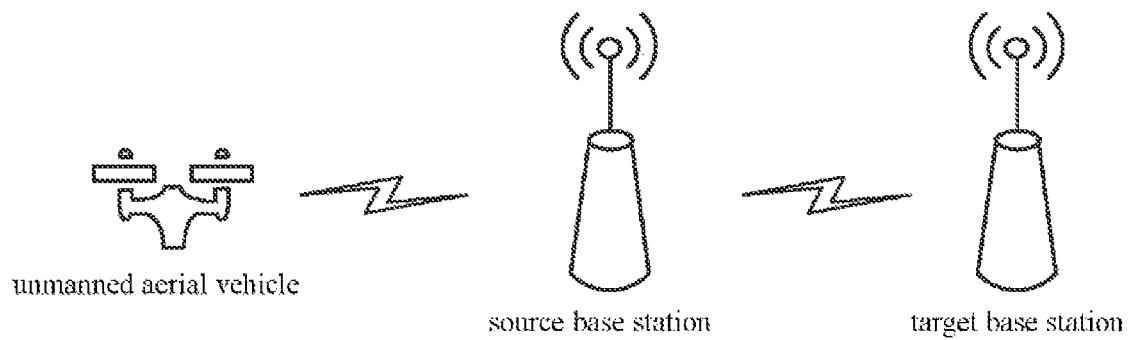
FIG. 2 is a scenario diagram of a base station handover method according to an exemplary embodiment.

FIG. 1 is a flowchart illustrating a base station handover method according to an exemplary embodiment, and FIG. 2 is a scenario diagram illustrating a base station handover method according to an exemplary embodiment. The base station handover method may be applied in a source base station, and the source base station is a base station currently providing service for the unmanned aerial vehicle. As shown in FIG. 1, the base station handover method includes following steps 110-130.

In step 110, a measurement report sent by the unmanned aerial vehicle is received. The measurement report includes information used to indicate a target base station for which the unmanned aerial vehicle requests handover.

In the embodiment of the present disclosure, the unmanned aerial vehicle is a cellular network unmanned aerial vehicle. That is, the unmanned aerial vehicle can accept service provided by a cellular network.

The measurement report sent by the unmanned aerial vehicle is information that the unmanned aerial vehicle sends to the source base station after detecting that the trigger condition for handover of the base station is met. In addition, the measurement report may include a cell number of the target base station, and may also include a RSRP (Reference Signal Receiving Power) value and a RSRQ (Reference Signal Receiving Quality) value of the target base station, and a RSRP value and a RSRQ value of the source base station.

In step 120, a handover request carrying first information is sent to the target base station, when it is determined that handover with the target base station is to be performed according to the measurement report. The first information is used to indicate that a terminal requesting handover is an unmanned aerial vehicle.

In the embodiment of the present disclosure, the source base station may determine which base station is the target base station requested for handover by the unmanned aerial vehicle according to the cell number of the target base station in the measurement report. The reason why the unmanned aerial vehicle requested to switch the base station can also be determined according to the RSRP value and RSRQ value of the target base station, and the RSRP value and RSRQ value of the source base station. For example, if the RSRP value of the target base station is greater than the RSRP value of the source base station, and the RSRQ value of the target base station is greater than the RSRQ value of the source base station, it indicates that a signal strength of the target base station is greater than that of the source base station, then the unmanned aerial vehicle requests handover from the source base station to the target base station to ensure continuity of location service of the unmanned aerial vehicle.

When the source base station determines that it will perform handover with the target base station, a handover preparation process is started. For example, handover preparation with the target base station is performed through an X2 interface, which is an interconnection interface between base stations and supports direct transmission of data and signaling. A handover request carrying the first information may be sent to the target base station. The handover request carrying the first information aims to inform the target base station that a terminal requesting the handover is an unmanned aerial vehicle. In this way, it facilitates the target base station to provide special configuration for the unmanned aerial vehicle when serving the unmanned aerial vehicle later. For example, dedicated transmission resources are configured for the unmanned aerial vehicle, or dedicated measurement manners are configured for the unmanned aerial vehicle, or the like.

After receiving the handover request carrying with the first information sent by the source base station, the target base station will send a handover request acknowledge to the source base station when it is determined that the target base station can provide service for the unmanned aerial vehicle. The handover request acknowledge indicates that the target base station agrees with the handover. When it is determined that the target base station cannot provide service for the unmanned aerial vehicle, a handover request failure will be sent to the source base station. The handover request failure indicates that the target base station does not agree with the handover.

In step 130, a handover operation switching from the source base station to the target base station is performed, when a handover request acknowledgement returned by the target base station is received.

In an exemplary scenario, as shown in FIG. 2, it includes an unmanned aerial vehicle, a source base station and a target base station. When the unmanned aerial vehicle detects that a trigger condition for handover of a base station is met during cell measurement, for example, when a signal strength of the target base station is greater than that of the source base station and a difference between them is greater than a set threshold, the unmanned aerial vehicle sends a measurement report to the source base station. The measurement report includes information used to indicate a target base station for which the unmanned aerial vehicle requests handover. After the source base station receives the measurement report sent by the unmanned aerial vehicle and determines that it will perform handover with the target base station based on the measurement report, a handover request carrying the first information is sent to the target base station. The first information is used to indicate that the terminal requesting the handover is an unmanned aerial vehicle. After the target base station receives the handover request carrying the first information sent by the source base station, it will determine whether the target base station itself can provide service for the unmanned aerial vehicle according to the handover request. When it is determined that the target base station can provide service for the unmanned aerial vehicle, a handover request acknowledge is sent to the source base station. When the source base station receives the handover request acknowledgement returned by the target base station, a handover operation switching from the source base station to the target base station is performed.

In order to ensure continuity of location service of the unmanned aerial vehicle, the unmanned aerial vehicle requests handover from the source base station to the target base station.

In this embodiment, through the above steps 110 to 130, the source base station may receive a measurement report sent by an unmanned aerial vehicle. When it is determined that the handover with a target base station is to be performed according to the measurement report, the source base station may also send a handover request carrying first information to the target base station. The first information is used to indicate that a terminal requesting handover is an unmanned aerial vehicle. Then, when a handover request acknowledge returned by the target base station is received, a handover operation switching from the source base station to the target base station can be performed, thereby realizing the handover of the base station for the unmanned aerial vehicle, ensuring continuity of service of the unmanned aerial vehicle and also broadening an application range of the unmanned aerial vehicles.

In an embodiment, the handover request sent by the source base station to the target base station further carries second information. The second information is used to indicate that the target base station needs to establish a first dedicated bearer for control commands and establish a second dedicated bearer for data transmission for the unmanned aerial vehicle. In the embodiment, the source base station instructs the target base station to establish the two dedicated bearers of control commands and data transmission for the unmanned aerial vehicle respectively, to ensure the business requirements of the unmanned aerial vehicle.

As can be seen from the foregoing embodiment, when the source base station sends a handover request to the target base station, it also needs to instruct the target base station to establish a first dedicated bearer for control commands and establish a second dedicated bearer for data transmission for the unmanned aerial vehicle. In this way, it can facilitate the target base station to determine whether it can establish the first dedicated bearer and the second dedicated bearer for the unmanned aerial vehicle according to the instruction of the source base station. Only when the target base station can establish the first dedicated bearer and the second dedicated bearer for the unmanned aerial vehicle, the target base station agrees with the handover, which meets business requirements of the unmanned aerial vehicle and also improves reliability of handover of the base station.

In an embodiment, the handover request sent by the source base station to the target base station further carries third information. The third information includes a first QCI (QoS Class Identifier) for indicating the first dedicated bearer and a second QCI for indicating the second dedicated bearer. The first QCI is different from the second QCI.

For example, the source base station specifies that the first QCI can be defined as GBR service, the packet delay is between 50 ms and 100 ms, and the packet error rate is between $10^{-4}$ and $10^{-3}$, and the second QCI can be defined as GBR service or non-GBR service, the packet delay is between 100 ms and 300 ms, and the packet error rate is between $10^{-6}$ and $10^{-5}$.

As can be seen from the above embodiment, when the source base station sends a handover request to the target base station, it also needs to indicate the first QCI of the first dedicated bearer and the second QCI, and the first QCI is different from the second QCI, which facilitates the target base station to allocate dedicated resources for the unmanned aerial vehicle to establish the first dedicated bearer corresponding to the first QCI and the second dedicated bearer corresponding to the second QCI. In this way, it reduces the interference of the unmanned aerial vehicle on adjacent base stations while achieving the business needs of the unmanned aerial vehicle.

Figure 3:
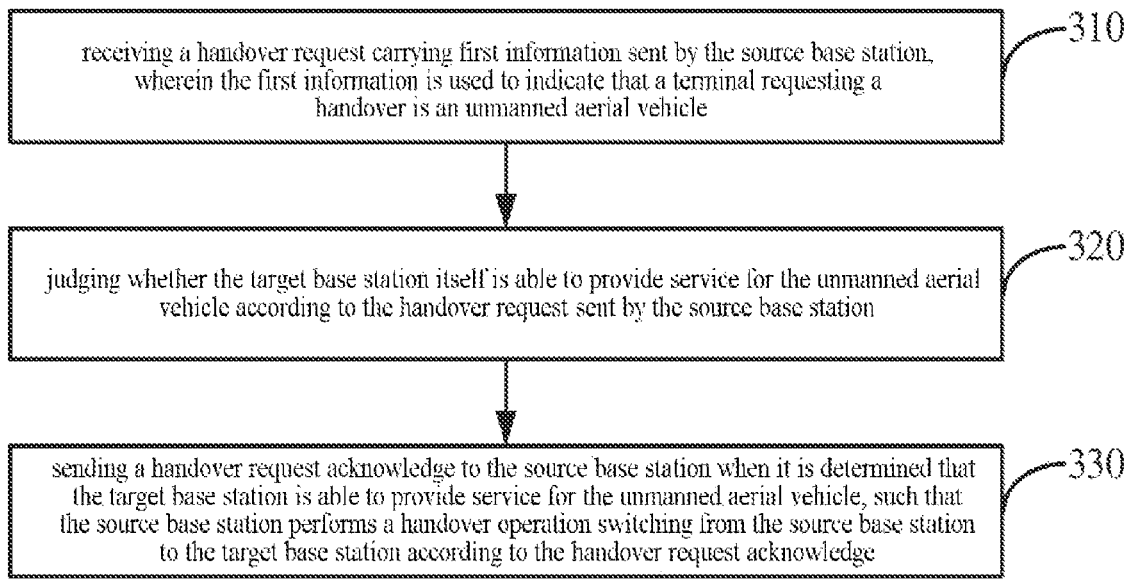
FIG. 3 is a flowchart of a base station handover method according to an exemplary embodiment.

FIG. 3 is a flowchart illustrating a base station handover method according to an exemplary embodiment. The base station handover method may be applied to a target base station. The target base station is a base station that an unmanned aerial vehicle requests for handover, and a source base station is a base station currently providing service for the unmanned aerial vehicle. As shown in FIG. 3, the base station handover method includes following steps 310-330.

In step 310, a handover request carrying first information sent by the source base station is received. The first information is used to indicate that a terminal requesting handover is an unmanned aerial vehicle.

In the embodiment of the present disclosure, after receiving the handover request carrying the first information sent by the base station, the target base station learns that the terminal requesting the handover of the base station is not one or other user terminals, but an unmanned aerial vehicle, according to the first information. The unmanned aerial vehicle requesting for handover of the base station is different from other user terminals requesting for handover of the base station. The target base station needs to perform special configuration for the unmanned aerial vehicle. For example: the target base station needs to configure dedicated transmission resources for unmanned aerial vehicles, or configure dedicated measurement manners for unmanned aerial vehicles.

In step 320, it is judged whether the target base station itself is able to provide service for the unmanned aerial vehicle according to the handover request sent by the source base station.

In the embodiment of the present disclosure, after learning that the terminal requesting handover is an unmanned aerial vehicle, the target base station needs to check whether there are sufficient resources to perform special configuration for the unmanned aerial vehicle. If so, it will determine that the target base station itself can provide service for the unmanned aerial vehicle; if not, it will determine that the target base station itself cannot provide service for the unmanned aerial vehicle.

In step 330, a handover request acknowledge is sent to the source base station when it is determined that the target base station is able to provide service for the unmanned aerial vehicle, such that the source base station performs a handover operation switching from the source base station to the target base station according to the handover request acknowledge sent by the target base station.

In the embodiment of the present disclosure, the target base station sends a handover request acknowledge to indicate that the target base station agrees with the handover. If the target base station does not agree with the handover, it will send a handover request failure to the source base station.

Through the above steps 310 to 330 in this embodiment, after receiving the handover request carrying the first information sent by the source base station, the target base station learns that the terminal requesting the handover is an unmanned aerial vehicle, and determines whether it can provide service for the unmanned aerial vehicle firstly. Only when it is determined that the target base station can provide service for the unmanned aerial vehicle, a handover request acknowledge is sent to the source base station, thereby ensuring continuity of service of the unmanned aerial vehicle and also improving efficiency and reliability of the handover of the base station.

In an embodiment, the handover request sent by the source base station further carries second information. The second information is used to indicate that the target base station needs to establish a first dedicated bearer for control commands and establish a second dedicated bearer for data transmission for the unmanned aerial vehicle. When step 320 is performed, it may include:

judging, according to the handover request, whether the target base station itself is able to establish a first dedicated bearer for control commands and establishing a second dedicated bearer for data transmission for the unmanned aerial vehicle;

determining that the target base station is able to provide service for the unmanned aerial vehicle, when it is determined that the target base station is able to establish the first dedicated bearer for control commands and the second dedicated bearer for data transmission for the unmanned aerial vehicle;

determining that the target base station is not able to provide service for the unmanned aerial vehicle, when it is determined that the target base station is not able to establish the first dedicated bearer for control commands and the second dedicated bearer for data transmission for the unmanned aerial vehicle.

As can be seen from the above embodiment, when the source base station sends a handover request to the target base station, it also needs to instruct the target base station to establish a first dedicated bearer for control commands and establish a second dedicated bearer for data transmission for the unmanned aerial vehicle. After receiving the handover request, the target base station needs to determine whether it can establish the first dedicated bearer and the second dedicated bearer for the unmanned aerial vehicle according to the instruction of the source base station. Only when the target base station can establish the first dedicated bearer and the second dedicated bearer for the unmanned aerial vehicle, it can determine that the target base station itself is able to provide service for the unmanned aerial vehicle, and then it agrees with the handover, thereby meeting business requirements of the unmanned aerial vehicle and improving the reliability of handover of the base station.

In an embodiment, the handover request sent by the source base station further carries second information. The second information is used to indicate that the target base station needs to establish a first dedicated bearer for control commands and establish a second dedicated bearer for data transmission for the unmanned aerial vehicle. When step 330 is performed, the handover request acknowledgement sent to the source base station may further include information for indicating that the target base station agrees to establish the first dedicated bearer and the second dedicated bearer.

As can be seen from the above embodiments, when the source base station sends a handover request to the target base station, it also needs to instruct the target base station to establish a first dedicated bearer for the control command and establish a second dedicated bearer for data transmission for the unmanned aerial vehicle. When the target base station agrees with the handover, it also needs to inform the source base station that the target base statin agrees to establish the first dedicated bearer and the second dedicated bearer, indicating that the target base station has the ability to establish the first dedicated bearer and the second dedicated bearer for the unmanned aerial vehicle, thereby satisfying the business requirements of the unmanned aerial vehicle and also improving the reliability of handover of the base station.

Figure 4:
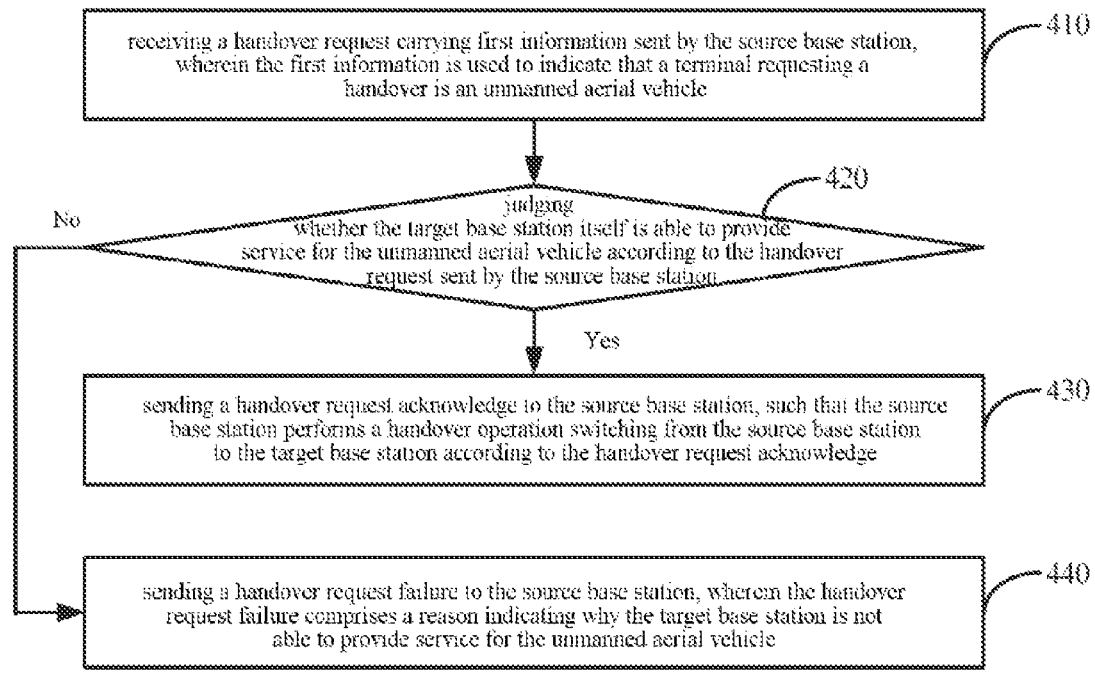
FIG. 4 is a flowchart of a base station handover method according to another exemplary embodiment.

FIG. 4 is a flowchart illustrating a base station handover method according to another exemplary embodiment. The base station handover method may be applied to a target base station. The target base station is a base station that an unmanned aerial vehicle requests for handover, and a source base station is a base station currently providing service for the unmanned aerial vehicle. As shown in FIG. 4, the base station handover method includes following steps 410-420.

In step 410, a handover request carrying first information sent by the source base station is received. The first information is used to indicate that a terminal requesting handover is an unmanned aerial vehicle.

In step 420, it is judged whether the target base station itself is able to provide service for the unmanned aerial vehicle according to the handover request sent by the source base station. If is, step 430 is performed; if not, step 440 is performed.

In step 430, a handover request acknowledge is sent to the source base station, such that the source base station performs a handover operation switching from the source base station to the target base station according to the handover request acknowledge sent by the target base station.

In step 440, a handover request failure is sent to the source base station. The handover request failure includes a reason indicating why the target base station is not able to provide service for the unmanned aerial vehicle.

Through the above steps 410 to 440, in this embodiment, after receiving the handover request carrying the first information sent by the source base station, the target base station learns that the terminal requesting the handover is an unmanned aerial vehicle, and determines whether it can provide service for the unmanned aerial vehicle firstly. When it is determined that the target base station can provide service for the unmanned aerial vehicle, a handover request acknowledge is sent to the source base station. When it is determined that the target base station cannot provide service for the unmanned aerial vehicle, a handover request failure is sent to the source base station. The handover request failure includes a reason indicating why the target base station cannot provide service for the unmanned aerial vehicle, so that the source base station can learn about a current situation of the target base station in time, which facilitates the source base station to adopt different processing manners according to different situations, thereby improving efficiency of the handover of the base station.

In an embodiment, the handover request sent by the source base station further carries second information. The second information is used to indicate that the target base station needs to establish a first dedicated bearer for control commands and establish a second dedicated bearer for data transmission for the unmanned aerial vehicle. When step 430 is performed, the handover request acknowledgement sent to the source base station may further include information for indicating that the target base station agrees to establish the first dedicated bearer and the second dedicated bearer.

In an embodiment, the handover request sent by the source base station further carries second information. The second information is used to indicate that the target base station needs to establish a first dedicated bearer for control commands and establish a second dedicated bearer for data transmission for the unmanned aerial vehicle. When step 440 is performed, the reason included in the handover request failure sent to the source base station may be that the target base station does not have sufficient resources to establish the first dedicated bearer for control commands and establish the second dedicated bearer for data transmission for the unmanned aerial vehicle.

Figure 5:
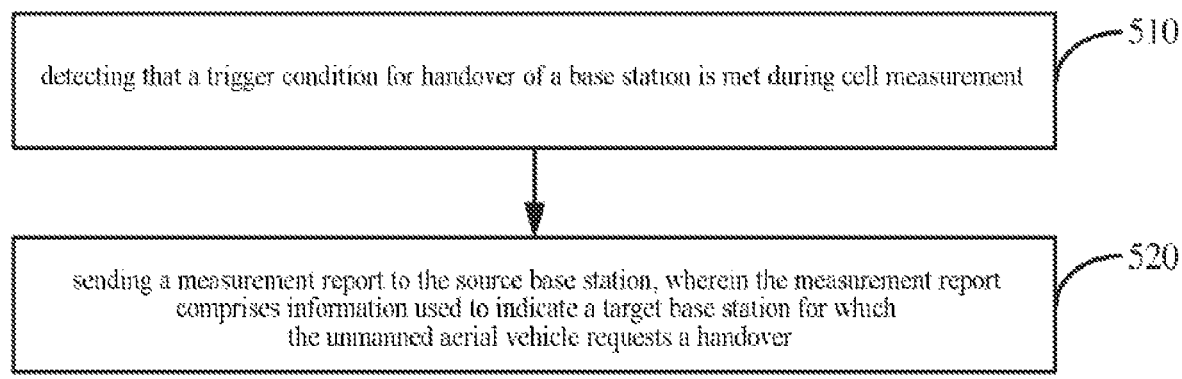
FIG. 5 is a flowchart of a base station handover method according to an exemplary embodiment.

FIG. 5 is a flowchart illustrating a base station handover method according to an exemplary embodiment. The base station handover method may be applied to an unmanned aerial vehicle. A base station currently providing service for the unmanned aerial vehicle is a source base station. As shown in FIG. 5, the base station handover method includes following steps 510-520.

In step 510, it is detected that a trigger condition for handover of a base station is met during cell measurement.

In step 520, a measurement report is sent to the source base station. The measurement report includes information used to indicate a target base station for which the unmanned aerial vehicle requests handover.

In this embodiment, through the above steps 510 to 520, when the unmanned aerial vehicle detects that a trigger condition for handover of a base station is met during cell measurement, it automatically sends a measurement report to the source base station. The measurement report includes information used to indicate a target base station for which the unmanned aerial vehicle requests handover, such that the source base station may learn about the demand of the unmanned aerial vehicle in time and improve efficiency of the handover of the base station.

In an embodiment, a trigger condition for handover of the base station may be a preset condition. For example: a signal strength of the target base station is greater than that of the source base station, and the difference between them is greater than a set threshold. In order to meet the business continuity of the unmanned aerial vehicle, the target base station is best to provide service for the unmanned aerial vehicle. At this time, the unmanned aerial vehicle will request the source base station to switch a base station serving it.

As can be seen from the foregoing embodiment, by using a preset condition as a trigger condition for handover of the base station, when the unmanned aerial vehicle finds that the preset condition is met during cell measurement, it indicates that the base station needs to be switched, which improves efficiency of handover of the base station.

In an embodiment, when 510 is performed, if trigger conditions for handover of the base station are different, corresponding detection manners are also different, including but not limited to following detection manners:

detecting that a signal strength of another base station is greater than a signal strength of the source base station, and a difference between the two signal strengths is greater than a set threshold;

determining that the trigger condition for handover of the base station is met, and determining the another base station as a target base station for which the unmanned aerial vehicle requests handover.

As can be seen from the above embodiments, by detecting the signal strength of each base station and selecting a base station with a larger signal strength to provide service for the unmanned aerial vehicle, it can not only ensure the business continuity of the unmanned aerial vehicle, but also reflect importance of handover of the base station, and then improves practicability of handover of the base station.

Corresponding to the foregoing embodiment of the base station handover method, the present disclosure also provides an embodiment of a base station handover apparatus.

Figure 6:
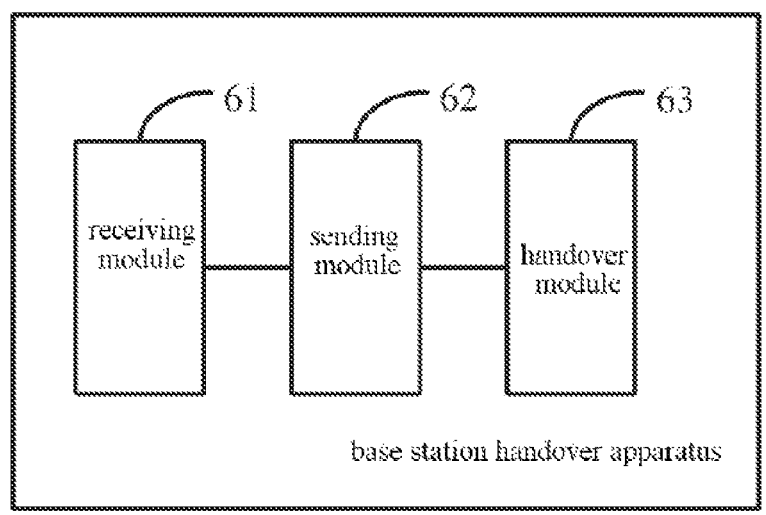
FIG. 6 is a block diagram of a base station handover apparatus according to an exemplary embodiment.

FIG. 6 is a block diagram of a base station handover apparatus according to an exemplary embodiment. The apparatus is applied to a source base station. The source base station is a base station currently providing service for an unmanned aerial vehicle. The apparatus is used to perform the base station handover method as shown in FIG. 1. As shown in FIG. 6, the base station handover apparatus may include:

a receiving module 61, configured to receive a measurement report sent by the unmanned aerial vehicle, wherein the measurement report includes information used to indicate a target base station for which the unmanned aerial vehicle requests handover;

a sending module 62, configured to send a handover request carrying first information to the target base station, when it is determined that handover with the target base station is to be performed according to the measurement report, wherein the first information is used to indicate that a terminal requesting handover is an unmanned aerial vehicle;

a handover module 63, configured to perform a handover operation switching from the source base station to the target base station, when a handover request acknowledgement returned by the target base station is received.

As can be seen from the above embodiments, the source base station may receive a measurement report sent by an unmanned aerial vehicle. When it is determined that the handover with a target base station is to be performed according to the measurement report, the source base station may also send a handover request carrying first information to the target base station. The first information is used to indicate that a terminal requesting handover is an unmanned aerial vehicle. Then, when a handover request acknowledge returned by the target base station is received, a handover operation switching from the source base station to the target base station can be performed, thereby realizing the handover of the base station for the unmanned aerial vehicle, ensuring continuity of service of the unmanned aerial vehicle and also broadening an application range of the unmanned aerial vehicles.

Optionally, the handover request further carries second information, the second information is used to indicate that the target base station needs to establish a first dedicated bearer for control commands and establish a second dedicated bearer for data transmission for the unmanned aerial vehicle.

As can be seen from the foregoing embodiment, when the source base station sends a handover request to the target base station, it also needs to instruct the target base station to establish a first dedicated bearer for control commands and establish a second dedicated bearer for data transmission for the unmanned aerial vehicle. In this way, it can facilitate the target base station to determine whether it can establish the first dedicated bearer and the second dedicated bearer for the unmanned aerial vehicle according to the instruction of the source base station. Only when the target base station can establish the first dedicated bearer and the second dedicated bearer for the unmanned aerial vehicle, the target base station will agree with the handover, which meets business requirements of the unmanned aerial vehicle and also improves the reliability of handover of the base station.

Optionally, the handover request further carries third information, the third information includes a first QCI for indicating the first dedicated bearer and a second QCI for indicating the second dedicated bearer, and the first QCI is different from the second QCI.

As can be seen from the above embodiment, when the source base station sends a handover request to the target base station, it also needs to indicate the first QCI of the first dedicated bearer and the second QCI, and the first QCI is different from the second QCI, which facilitates the target base station to allocate dedicated resources for the unmanned aerial vehicle to establish the first dedicated bearer corresponding to the first QCI and the second dedicated bearer corresponding to the second QCI. In this way, it reduces the interference of the unmanned aerial vehicle on adjacent base stations while achieving the business needs of the unmanned aerial vehicle.

Figure 7:
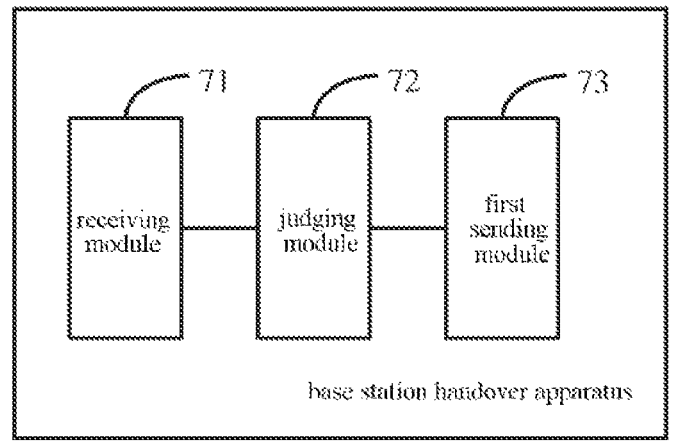
FIG. 7 is a block diagram of a base station handover apparatus according to an exemplary embodiment.

FIG. 7 is a block diagram of a base station handover apparatus according to an exemplary embodiment. The apparatus is applied to a target base station. The target base station is a base station that the unmanned aerial vehicle requests for handover. A source base station is a base station currently providing service for the unmanned aerial vehicle. The apparatus is used to perform the base station handover method shown in FIG. 3. As shown in FIG. 7, the base station handover apparatus may include:

a receiving module 71, configured to receive a handover request sent by the source base station and carrying first information, wherein the first information is used to indicate that a terminal requesting handover is an unmanned aerial vehicle;

a judging module 72, configured to judge whether the target base station itself is able to provide service for the unmanned aerial vehicle according to the handover request;

a first sending module 73, configured to send a handover request acknowledge to the source base station when it is determined that the target base station is able to provide service for the unmanned aerial vehicle, such that the source base station performs a handover operation switching from the source base station to the target base station according to the handover request acknowledge.

As can be seen from the above embodiment, after receiving the handover request carrying the first information sent by the source base station, the target base station learns that the terminal requesting the handover is an unmanned aerial vehicle, and determines whether it can provide service for the unmanned aerial vehicle firstly. Only when it is determined that the target base station can provide service for the unmanned aerial vehicle, a handover request acknowledge is sent to the source base station, thereby ensuring continuity of service of the unmanned aerial vehicle and also improving efficiency and reliability of the handover of the base station.

Figure 8:
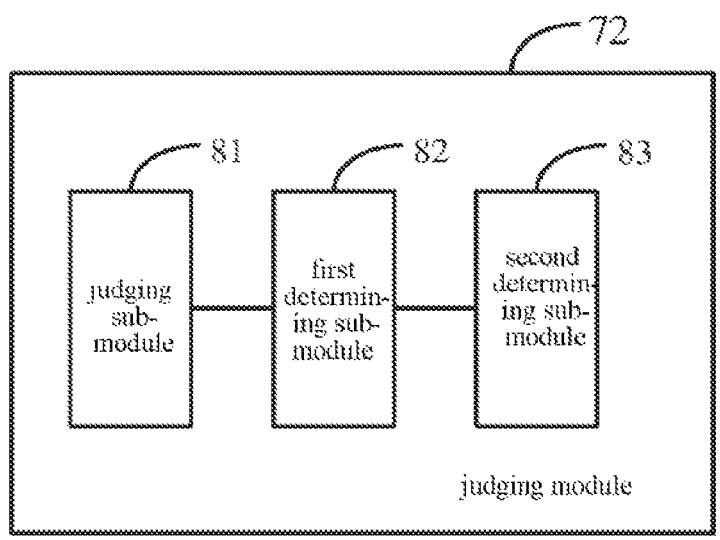
FIG. 8 is a block diagram of a base station handover apparatus according to another exemplary embodiment.

FIG. 8 is a block diagram of a base station handover apparatus according to another exemplary embodiment. The apparatus is applied to a target base station, the target base station is a base station that an unmanned aerial vehicle requests for handover, and a source base station is a base station currently providing service for the unmanned aerial vehicle. The apparatus is based on the apparatus shown in FIG. 7 and is used to perform the base station handover method shown in FIG. 4. As shown in FIG. 8, the handover request further carries second information, the second information is used to indicate that the target base station needs to establish a first dedicated bearer for control commands and establish a second dedicated bearer for data transmission for the unmanned aerial vehicle; the judging module 72 may include:

a judging sub-module 81, configured to judge, according to the handover request, whether the target base station itself is able to establish a first dedicated bearer for control commands and establishing a second dedicated bearer for data transmission for the unmanned aerial vehicle;

a first determining sub-module 82, configured to determine that the target base station is able to provide service for the unmanned aerial vehicle, when it is determined that the target base station is able to establish the first dedicated bearer and the second dedicated bearer for the unmanned aerial vehicle;

a second determining sub-module 83, configured to determine that the target base station is not able to provide service for the unmanned aerial vehicle, when it is determined that the target base station is not able to establish the first dedicated bearer and the second dedicated bearer for the unmanned aerial vehicle.

Optionally, the handover request acknowledgement sent by the first sending module 73 includes information for indicating that the target base station agrees to establish the first dedicated bearer and the second dedicated bearer.

As can be seen from the above embodiment, when the source base station sends a handover request to the target base station, it also needs to instruct the target base station to establish a first dedicated bearer for control commands and establish a second dedicated bearer for data transmission for the unmanned aerial vehicle. After receiving the handover request, the target base station needs to determine whether it can establish the first dedicated bearer and the second dedicated bearer for the unmanned aerial vehicle according to the instruction of the source base station. Only when the target base station can establish the first dedicated bearer and the second dedicated bearer for the unmanned aerial vehicle, it can determine that the target base station itself is able to provide service for the unmanned aerial vehicle, and then it agrees with the handover, thereby meeting business requirements of the unmanned aerial vehicle and improving the reliability of handover of the base station.

Optionally, the apparatus further includes:

a second sending module, configured to send a handover request failure to the source base station when it is determined that the target base station is not able to provide service for the unmanned aerial vehicle, wherein the handover request failure includes a reason indicating why the target base station is not able to provide service for the unmanned aerial vehicle.

As can be seen from the foregoing embodiment, after receiving the handover request carrying the first information sent by the source base station, the target base station learns that the terminal requesting the handover is an unmanned aerial vehicle, and determines whether it can provide service for the unmanned aerial vehicle firstly. When it is determined that the target base station can provide service for the unmanned aerial vehicle, a handover request acknowledge is sent to the source base station. When it is determined that the target base station cannot provide service for the unmanned aerial vehicle, a handover request failure is sent to the source base station. The handover request failure includes a reason indicating why the target base station cannot provide service for the unmanned aerial vehicle, so that the source base station can learn about a current situation of the target base station in time, which facilitates the source base station to adopt different processing manners according to different situations, thereby improving efficiency of the handover of the base station.

Figure 9:
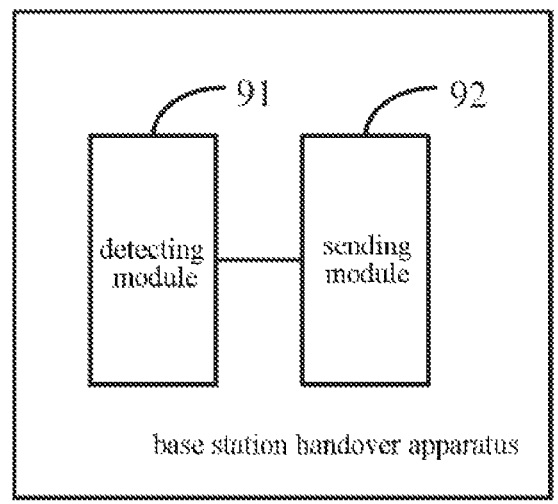
FIG. 9 is a block diagram of a base station handover apparatus according to an exemplary embodiment.

FIG. 9 is a block diagram of a base station handover apparatus according to an exemplary embodiment. The apparatus is applied to an unmanned aerial vehicle. A base station currently providing service for the unmanned aerial vehicle is a source base station. The apparatus is used to execute the base station handover method shown in FIG. 5. As shown in FIG. 9, the base station handover apparatus may include:

a detecting module 91, configured to detect that a trigger condition for handover of a base station is met during cell measurement;

a sending module 92, configured to send a measurement report to the source base station, wherein the measurement report includes information used to indicate a target base station for which the unmanned aerial vehicle requests handover.

As can be seen from the above embodiment, when the unmanned aerial vehicle detects that a trigger condition for handover of a base station is met during cell measurement, it automatically sends a measurement report to the source base station. The measurement report includes information used to indicate a target base station for which the unmanned aerial vehicle requests handover, such that the source base station may learn about the demand of the unmanned aerial vehicle in time and improve efficiency of the handover of the base station.

Figure 10:
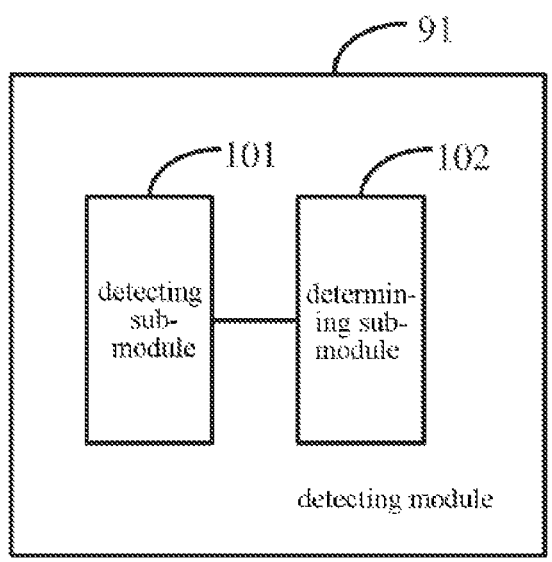
FIG. 10 is a block diagram of a base station handover apparatus according to another exemplary embodiment.

FIG. 10 is a block diagram of a base station handover apparatus according to another exemplary embodiment. The apparatus is applied to an unmanned aerial vehicle. A base station currently providing service for the unmanned aerial vehicle is a source base station. The apparatus is based on the apparatus shown in FIG. 9. As shown in FIG. 10, the detecting module 91 may include:

a detecting sub-module 101, configured to detect that a signal strength of another base station is greater than a signal strength of the source base station, and a difference between the two signal strengths is greater than a set threshold;

a determining sub-module 102, configured to determine that the trigger condition for handover of the base station is met, and determining the another base station as a target base station for which the unmanned aerial vehicle requests handover.

As can be seen from the above embodiments, by detecting the signal strength of each base station and selecting a base station with a larger signal strength to provide service for the unmanned aerial vehicle, it can not only ensure the business continuity of the unmanned aerial vehicle, but also reflect importance of handover of the base station, and then improves practicability of handover of the base station.

As for the apparatus embodiment, since it basically corresponds to the method embodiment, the relevant part may refer to the description of the method embodiment. The apparatus embodiments described above are only schematic, in which the units described as separate components may or may not be physically separated. The components shown as units may or may not be physical units, that is, they may be located in one place, or can be distributed across multiple network elements. Some or all of the modules can be selected according to actual needs to achieve the objectives of the solution of the present disclosure. Those of ordinary skill in the art can understand and implement without creative efforts.

Correspondingly, the present disclosure further provides a computer readable storage medium, having stored a computer program thereon, wherein the computer program is configured to perform the base station handover method as shown in FIG. 1.

Correspondingly, the present disclosure further provides a computer readable storage medium, having stored a computer program thereon, wherein the computer program is configured to perform the base station handover methods as shown in FIGS. 3-4.

Correspondingly, the present disclosure further provides a computer readable storage medium, having stored a computer program thereon, wherein the computer program is configured to perform the base station handover method as shown in FIG. 5.

Correspondingly, the present disclosure further provides a base station handover apparatus, wherein the apparatus is applied to a source base station, the source base station is a base station currently providing service for an unmanned aerial vehicle, and the apparatus includes:

a processor; and a memory for storing processor executable instructions, wherein the processor is configured to perform:

receiving a measurement report sent by the unmanned aerial vehicle, wherein the measurement report includes information used to indicate a target base station for which the unmanned aerial vehicle requests handover;

sending a handover request carrying first information to the target base station, when it is determined that handover with the target base station is to be performed according to the measurement report, wherein the first information is used to indicate that a terminal requesting handover is an unmanned aerial vehicle;

performing a handover operation switching from the source base station to the target base station, when a handover request acknowledgement returned by the target base station is received.

Figure 11:
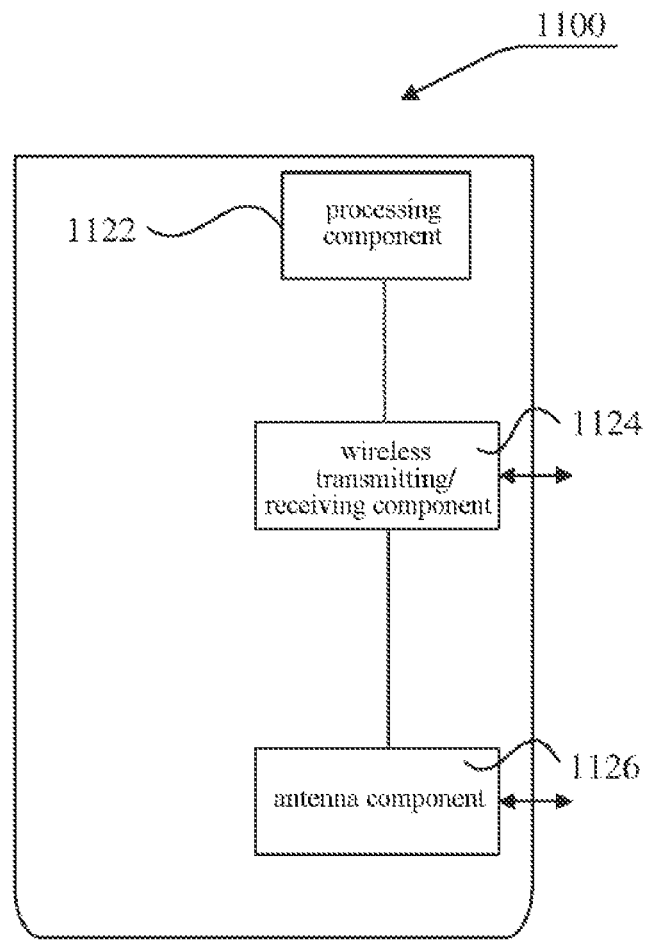
FIG. 11 is a schematic structural diagram of a base station handover apparatus according to an exemplary embodiment.

As shown in FIG. 11, FIG. 11 is a schematic structural diagram of a base station handover apparatus according to an exemplary embodiment. The apparatus 1100 may be provided as a source base station 11. Referring to FIG. 11, the apparatus 1100 includes a processing component 1122, a wireless transmitting/receiving component 1124, an antenna component 1126, and a signal processing portion specific to a wireless interface. The processing component 1122 may further include one or more processors.

One of the processors in the processing component 1122 may be configured to perform any one of the above base station handover methods.

Correspondingly, the present disclosure further provides a base station handover apparatus, wherein the apparatus is applied to a target base station, the target base station is a base station that an unmanned aerial vehicle requests for handover, and a source base station is a base station currently providing service for the unmanned aerial vehicle, and the apparatus includes:

a processor; and a memory for storing processor executable instructions, wherein the processor is configured to perform:

receiving a handover request carrying first information sent by the source base station, wherein the first information is used to indicate that a terminal requesting handover is an unmanned aerial vehicle;

judging whether the target base station itself is able to provide service for the unmanned aerial vehicle according to the handover request;

sending a handover request acknowledge to the source base station when it is determined that the target base station is able to provide service for the unmanned aerial vehicle, such that the source base station performs a handover operation switching from the source base station to the target base station according to the handover request acknowledge.

Figure 12:
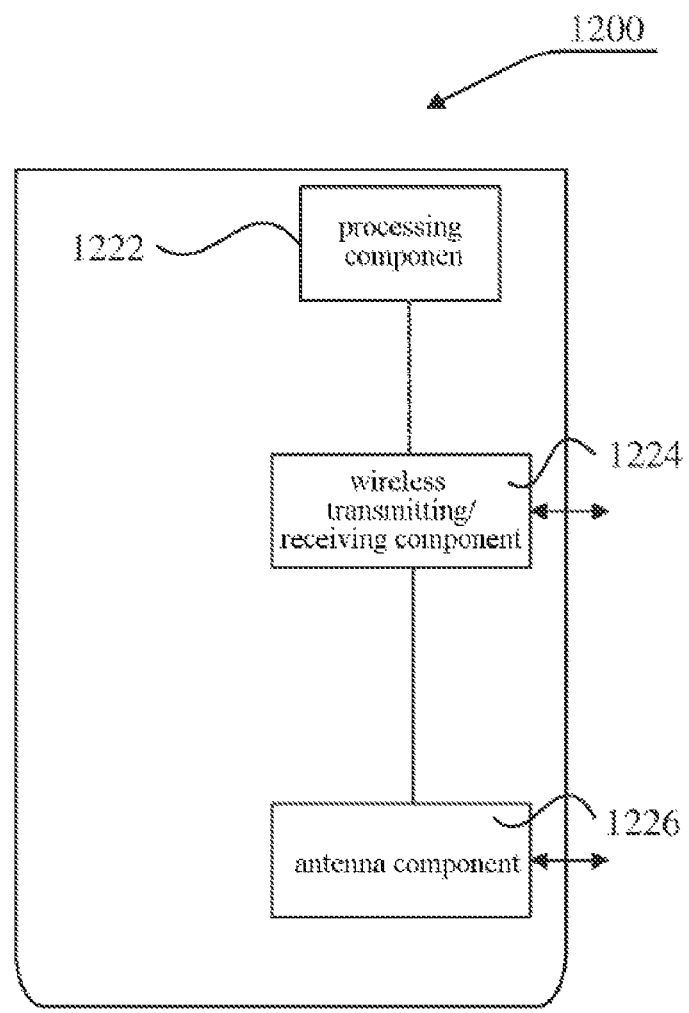
FIG. 12 is a schematic structural diagram of a base station handover apparatus according to an exemplary embodiment.

As shown in FIG. 12, FIG. 12 is a schematic structural diagram of a base station handover apparatus according to an exemplary embodiment. The apparatus 1200 may be provided as a target base station. Referring to FIG. 12, the apparatus 1200 includes a processing component 1222, a wireless transmitting/receiving component 1224, an antenna component 1226, and a signal processing portion specific to a wireless interface. The processing component 1222 may further include one or more processors.

One of the processors in the processing component 1222 may be configured to perform any one of the above base station handover methods.

Correspondingly, the present disclosure further provides a base station handover apparatus, wherein the apparatus is applied to an unmanned aerial vehicle, a base station currently providing service for the unmanned aerial vehicle is a source base station, and the apparatus includes:

a processor; and a memory for storing processor executable instructions, wherein the processor is configured to perform:

detecting that a trigger condition for handover of a base station is met during cell measurement;

sending a measurement report to the source base station, wherein the measurement report includes information used to indicate a target base station for which the unmanned aerial vehicle requests handover.

It should be understood that the present disclosure is not limited to the precise structure that has been described above and illustrated in the accompanying drawings, and various modifications and changes can be made without departing from the scope thereof. The scope of the disclosure is limited only by the appended claims.

The invention claimed is:

1. A base station handover method, wherein the method is applied to a source base station, the source base station is a base station currently providing service for an unmanned aerial vehicle, and the method comprises:

receiving a measurement report sent by the unmanned aerial vehicle, wherein the measurement report comprises information used to indicate a target base station for which the unmanned aerial vehicle requests handover;

sending a handover request carrying first information to the target base station, when it is determined that handover with the target base station is to be performed according to the measurement report, wherein the first information is used to indicate that a terminal requesting handover is an unmanned aerial vehicle;

performing a handover operation switching from the source base station to the target base station, when a handover request acknowledgement returned by the target base station is received, wherein the handover request further carries second information, the second information is used to indicate that the target base station needs to establish a first dedicated bearer for control commands and establish a second dedicated bearer for data transmission for the unmanned aerial vehicle.

2. The method according to claim 1, wherein the handover request further carries third information, the third information comprises a first QCI (QOS class identifier) for indicating the first dedicated bearer and a second QCI for indicating the second dedicated bearer, and the first QCI is different from the second QCI.

3. A base station handover apparatus implementing the method of claim 1, wherein the apparatus is applied to a source base station, the source base station is a base station currently providing service for an unmanned aerial vehicle, and the apparatus comprises:

a processor; and a memory for storing processor executable instructions, wherein the processor is configured to perform steps of the method.

4. The apparatus according to claim 3, wherein the handover request further carries third information, the third information comprises a first QCI (QOS class identifier) for indicating the first dedicated bearer and a second QCI for indicating the second dedicated bearer, and the first QCI is different from the second QCI.

5. A base station handover method, wherein the method is applied to a target base station, the target base station is a base station that an unmanned aerial vehicle requests for handover, and a source base station is a base station currently providing service for the unmanned aerial vehicle, and the method comprises:

receiving a handover request carrying first information sent by the source base station, wherein the first information is used to indicate that a terminal requesting handover is an unmanned aerial vehicle;

judging whether the target base station itself is able to provide service for the unmanned aerial vehicle according to the handover request;

sending a handover request acknowledge to the source base station when it is determined that the target base station is able to provide service for the unmanned aerial vehicle, such that the source base station performs a handover operation switching from the source base station to the target base station according to the handover request acknowledge, wherein the handover request further carries second information, the second information is cc to indicate that the target base station needs to establish a first dedicated bearer for control commands and establish a second dedicated bearer for data transmission for the unmanned aerial vehicle.

6. The method according to claim 5, judging whether the target base station itself is able to provide service for the unmanned aerial vehicle according to the handover request comprises:

judging, according to the handover request, whether the target base station itself is able to establish a first dedicated bearer for control commands and establishing a second dedicated bearer for data transmission for the unmanned aerial vehicle;

determining that the target base station is able to provide service for the unmanned aerial vehicle, when it is determined that the target base station is able to establish the first dedicated bearer and the second dedicated bearer for the unmanned aerial vehicle; and determining that the target base station is not able to provide service for the unmanned aerial vehicle, when it is determined that the target base station is not able to establish the first dedicated bearer and the second dedicated bearer for the unmanned aerial vehicle.

7. The method according to claim 6, wherein the handover request acknowledge comprises information for indicating that the target base station agrees to establish the first dedicated bearer and the second dedicated bearer.

8. The method according to claim 6, further comprising:

sending a handover request failure to the source base station when it is determined that the target base station is not able to provide service for the unmanned aerial vehicle, wherein the handover request failure comprises a reason indicating why the target base station is not able to provide service for the unmanned aerial vehicle.

9. The method according to claim 5, further comprising:

sending a handover request failure to the source base station when it is determined that the target base station is not able to provide service for the unmanned aerial vehicle, wherein the handover request failure comprises a reason indicating why the target base station is not able to provide service for the unmanned aerial vehicle.

10. A base station handover apparatus implementing the method of claim 5, wherein the apparatus is applied to a target base station, the target base station is a base station that an unmanned aerial vehicle requests for handover, and a source base station is a base station currently providing service for the unmanned aerial vehicle, and the apparatus comprises:

a processor; and a memory for storing processor executable instructions, wherein the processor is configured to perform steps of the method.

11. The apparatus according to claim 10, wherein the handover request further carries second information, the second information is used to indicate that the target base station needs to establish a first dedicated bearer for control commands and establish a second dedicated bearer for data transmission for the unmanned aerial vehicle; the processor is further configured to:

judge, according to the handover request, whether the target base station itself is able to establish a first dedicated bearer for control commands and establishing a second dedicated bearer for data transmission for the unmanned aerial vehicle;

determine that the target base station is able to provide service for the unmanned aerial vehicle, when it is determined that the target base station is able to establish the first dedicated bearer and the second dedicated bearer for the unmanned aerial vehicle;

determine that the target base station is not able to provide service for the unmanned aerial vehicle, when it is determined that the target base station is not able to establish the first dedicated bearer and the second dedicated bearer for the unmanned aerial vehicle.

12. The apparatus according to claim 11, wherein handover request acknowledgement returned by the target base station comprises information for indicating that the target base station agrees to establish the first dedicated bearer and the second dedicated bearer.

13. The apparatus according to claim 10, wherein the processor is further configured to:

send a handover request failure to the source base station when it is determined that the target base station is not able to provide service for the unmanned aerial vehicle, wherein the handover request failure comprises a reason indicating why the target base station is not able to provide service for the unmanned aerial vehicle.

14. The apparatus according to claim 11, wherein the processor is further configured to:

send a handover request failure to the source base station when it is determined that the target base station is not able to provide service for the unmanned aerial vehicle, wherein the handover request failure comprises a reason indicating why the target base station is not able to provide service for the unmanned aerial vehicle.

15. A base station handover method, wherein the method is applied to an unmanned aerial vehicle, a base station currently providing service for the unmanned aerial vehicle is a source base station, and the method comprises:

detecting that a trigger condition for handover of a base station is met during cell measurement;

sending a measurement report to the source base station, wherein the measurement report comprises information used to indicate a target base station for which the unmanned aerial vehicle requests handover, wherein the target base station is configured to establish a first dedicated bearer for control commands and establish a second dedicated bearer for data transmission for the unmanned aerial vehicle.

16. The method according to claim 15, wherein the detecting that a trigger condition for handover of a base station is met comprises:

detecting that a signal strength of another base station is greater than a signal strength of the source base station, and a difference between the two signal strengths is greater than a set threshold;

determining that the trigger condition for handover of the base station is met, and determining the another base station as a target base station for which the unmanned aerial vehicle requests handover.

17. A base station handover apparatus implementing the method of claim 15, wherein the apparatus is applied to an unmanned aerial vehicle, a base station currently providing service for the unmanned aerial vehicle is a source base station, and the apparatus comprises:
- a processor; and
- a memory for storing processor executable instructions, wherein the processor is configured to perform steps of the method.

18. The apparatus according to claim 17, wherein the processor is further configured to:
- detect that a signal strength of another base station is greater than a signal strength of the source base station, and a difference between the two signal strengths is greater than a set threshold;
- determine that the trigger condition for handover of the base station is met, and determining the another base station as a target base station for which the unmanned aerial vehicle requests handover.

* * * * *